United States Patent [19]

Kimura et al.

[11] Patent Number: 4,654,672
[45] Date of Patent: Mar. 31, 1987

[54] MULTIPLE COLOR RECORDING APPARATUS

[75] Inventors: Toshio Kimura; Teruhiko Tokumo; Ken Matsumura, all of Tokyo, Japan

[73] Assignee: Yokogawa Hokushin Electric Corporation, Tokyo, Japan

[21] Appl. No.: 836,536

[22] Filed: Mar. 5, 1986

[30] Foreign Application Priority Data

Oct. 18, 1985 [JP] Japan .................................. 60-232879

[51] Int. Cl.$^4$ ............................................... G01D 9/32
[52] U.S. Cl. ........................................ 346/46; 346/17; 400/240.4
[58] Field of Search ...................... 346/17, 34, 46, 105, 346/106; 340/753; 400/240.4

[56] References Cited

U.S. PATENT DOCUMENTS

| | | | |
|---|---|---|---|
| 1,660,921 | 2/1928 | Fischer | 346/46 X |
| 1,784,522 | 12/1930 | Harrison | 346/46 X |
| 3,623,124 | 11/1971 | Platz | 346/46 |
| 3,684,870 | 8/1972 | Nelson | 340/753 X |
| 3,754,121 | 8/1973 | Delay | 340/753 X |
| 4,433,338 | 2/1984 | Nakagawa | 346/46 X |

Primary Examiner—Joseph W. Hartary
Attorney, Agent, or Firm—Moonray Kojima

[57] ABSTRACT

A multi-colored recording apparatus comprising a carriage disposed to be movable in the width direction and having a single wire hammer, a ribbon cassette having a plurality of different colored ribbons extending an effective width of the recording sheet, a driving mechanism for causing the ribbon cassette to rotate and bring one colored ribbon in position between the hammer and recording sheet for effecting recording and move the cassette away from the recording sheet after recording, wherein the recorded data is advantageously readily read without interference of the cassette with the reading, and display for displaying a bar graph for the analog signals as represented by the different colored ribbons, wherein the use of only a single hammer with the movable cassette containing the different colored ribbons extending the effective width of the recording sheet provides a compact and light apparatus.

2 Claims, 9 Drawing Figures

MULTIPLE COLOR RECORDING APPARATUS

BACKGROUND OF THE INVENTION

1. Field of Invention

This invention relates to a color dot recorder, and more particularly to such a recorder wherein a multicolored ribbon is used to record analog data in the form of a plurality of dots of different colors and to record various characters and symbols in one or more arbitrary colors.

2. Discussion of the Prior Art

A conventional dot color recorder is known, such as disclosed in U.S. Pat. No. 4,433,338 and shown in FIG. 1, and comprises an inked ribbon unit 10, an inked ribbon 11 having a plurality of lengthwise extending different color channels arranged in a side by side relation, an inked ribbon cassette 12 in which is housed the inked ribbon 11, a plurality of wire hammer units 20 arranged in the direction of movement of a carriage (not shown) and each in opposing relation with each color channel of the inked ribbon 11, a wire hammer 21 which is a component of each wire hammer unit 20, a driving mechanism 22 for selectively driving wire hammers 21 in response to recording signals, a recording sheet 30, and a platen 40. Ribbon unit 10 and wire hammer units 20 are mounted on the carriage (not shown) in such a way that wire hammers 21 are in opposing relation with recording sheet 30 through inked ribbon 11.

In the conventional color dot recorder, the carriage reciprocates over the effective recording width including zero and span of recording sheet 30 in a direction perpendicular to the direction of feed of sheet 30, and is stopped at a position corresponding to the magnitude of a recording signal. While the carriage remains stationary, wire hammers 21 are selectively driven in response to the recording signals so that the corresponding color channels of ribbon 11 are pressed against sheet 30 and consequently color dots are recorded. In response to the driving of wire hammers 21, ribbon 11 is moved at a predetermined rate in the direction of feed of sheet 30, and sheet 30 is moved by a predetermined length generally when the carriage is reversed in direction and is maintained stationary when the carriage does not reach the point where the direction of movement of the carriage is reversed.

FIG. 2 shows the relationship between ribbon 11 and wire hammers 11 of the conventional dot recorder. Wire hammers $21_1$-$21_6$ are disposed in the direction of movement of carriage indicated by a double pointed arrow A in opposing relation to the different color channels or strips $C_1$-$C_6$, respectively, of ribbon 11. That is there is one wire hammer for each color strip.

The conventional color dot recorder has many disadvantages and deficiencies. For example, ribbon unit 10 and hammer unit 20 are mounted on the carriage so that the number of components is large. Consequently, the conventional color dot recorder is expensive.

Furthermore, the plurality of hammer units 20 are disposed in the direction of movement of the carriage so that the effective recording width of the sheet 30 is relatively narrow. Thus, with conventional color dot recorders, the total width for the recorder itself must be wider than the width desired of the recording sheet. Consequently, conventional color dot recorders are not very compact size.

Moreover, the conventional carriage is heavy in weight so that a relatively large, high powered motor must be used in order to move the carriage at high speeds. Thus, power consumption is large and considerable heat must be removed. Furthermore, since the carriage is heavy, a blinded sector, caused by insufficient rigidity of a driving string and by insufficient torque of a driving motor, results in a poor recording quality.

Also, the operation of the recorder itself is not satisfactory because when the ribbon cassette is replaced it must be displaced in the direction of movement of the wire hammers.

Furthermore, the carriage is relatively large in size and is caused to reciprocate over the recording sheet and hence it is difficult to read the results immediately after recording.

Finally, even though the measured results and alarm settings are displayed on a digital display, it is difficult to readily determine at a glance the relationship therebetween.

SUMMARY OF THE INVENTION

Accordingly, an object of the invention is to overcome the aforementioned and other deficiencies and disadvantages of the prior art.

Another object is to provide an inexpensive color dot recorder wherein the carriage is compact in size and light in weight so that the effective recording width of a recording paper is increased and a high degree of performance of the recorder is obtained, and wherein replacement of the inked ribbon cassette is simplified so that overall operation of the recorder is improved, and wherein the recorded results can be read out immediately after recording, and wherein the relationship between the measurement values and the alarm settings can be determined readily at a glance.

DETAILED DESCRIPTION OF THE PREFERRED EMBODIMENTS

Figure 2:
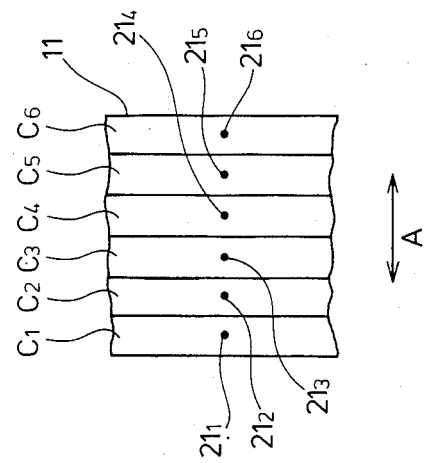
FIG. 2 shows a conventional multicolor ribbon and a conventional hammer arrangement showing a plurality of hammers corresponding to the different colors.
Figure 1:
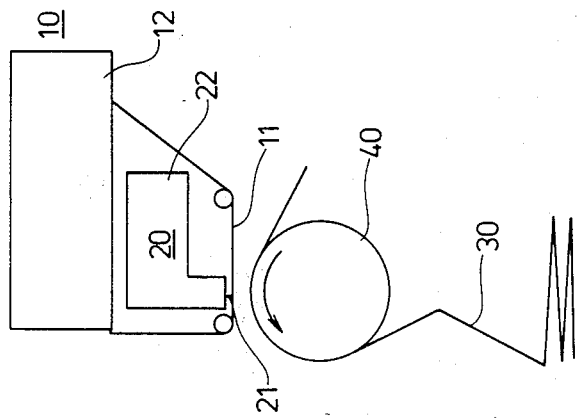
FIG. 1 is a schematic view depicting a conventional color dot recorder.
Figure 3:
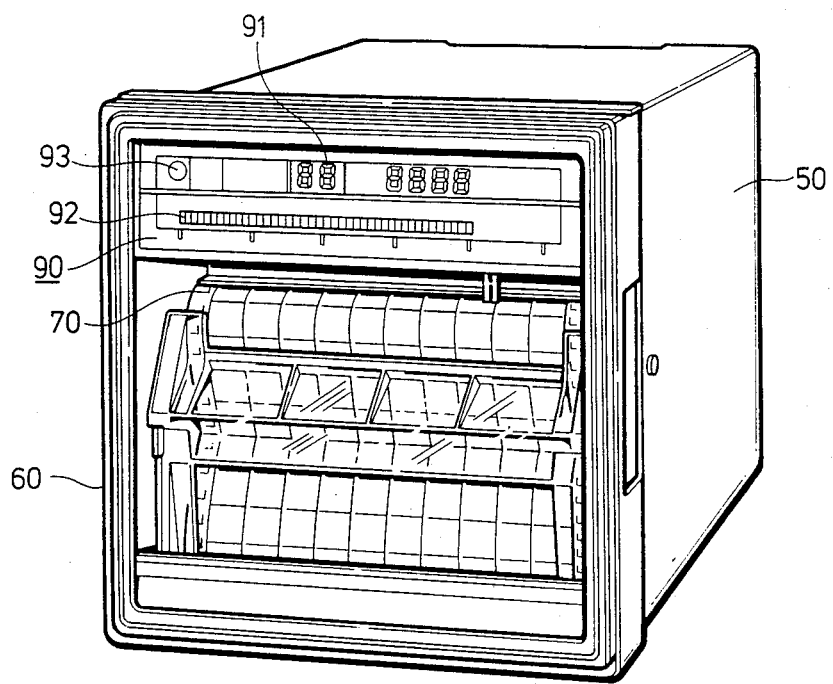
FIG. 3 is a perspective view of the outside of an illustrative embodiment of the invention.

FIG. 3 shows the outer view of a preferred embodiment comprising a case 50, in the form of a polyhedron and a door 60 rotatably attached to a front open end of case 50. An interior assembly 70 is removably housed in case 50.

Figure 4:
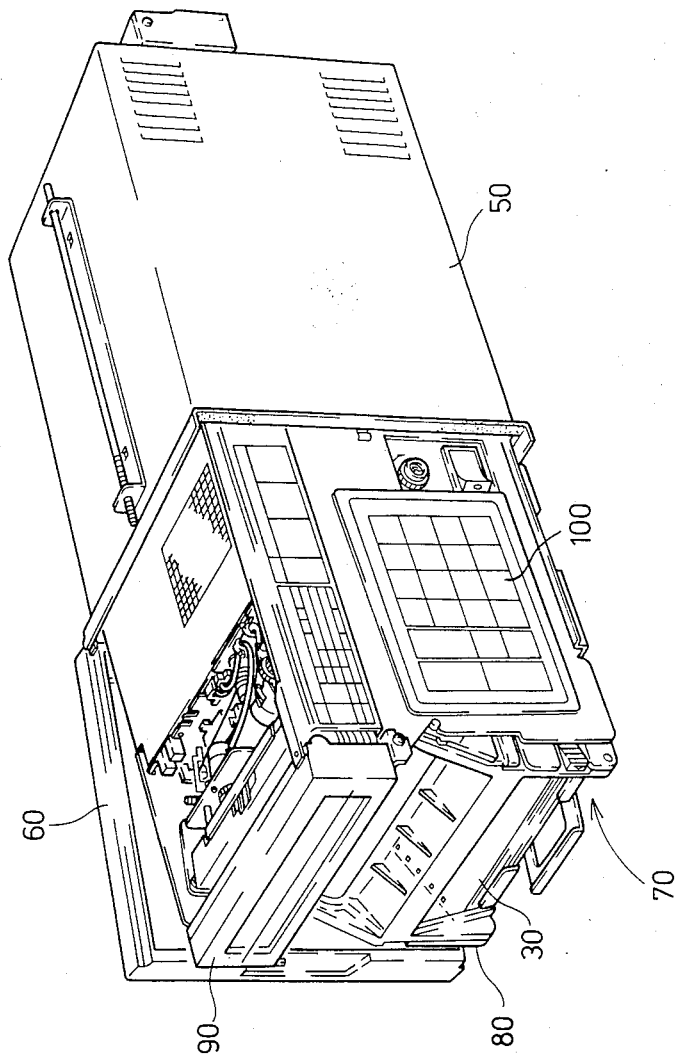
FIG. 4 is a perspective view depicting an interior assembly withdrawn from the embodiment of FIG. 3.
Figure 5:
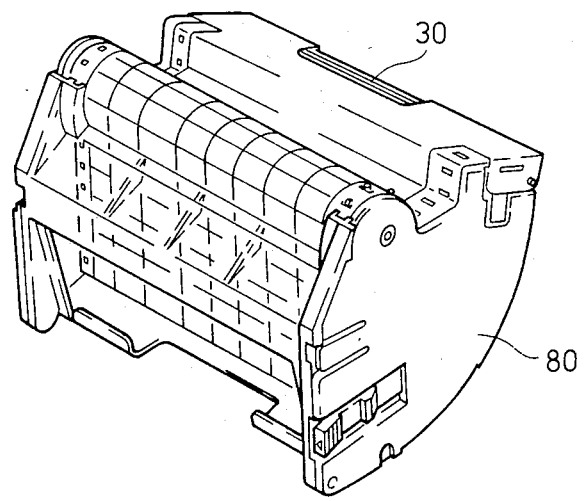
FIG. 5 is a perspective view of a chart cassette used in the embodiment of FIG. 3.
Figure 6:
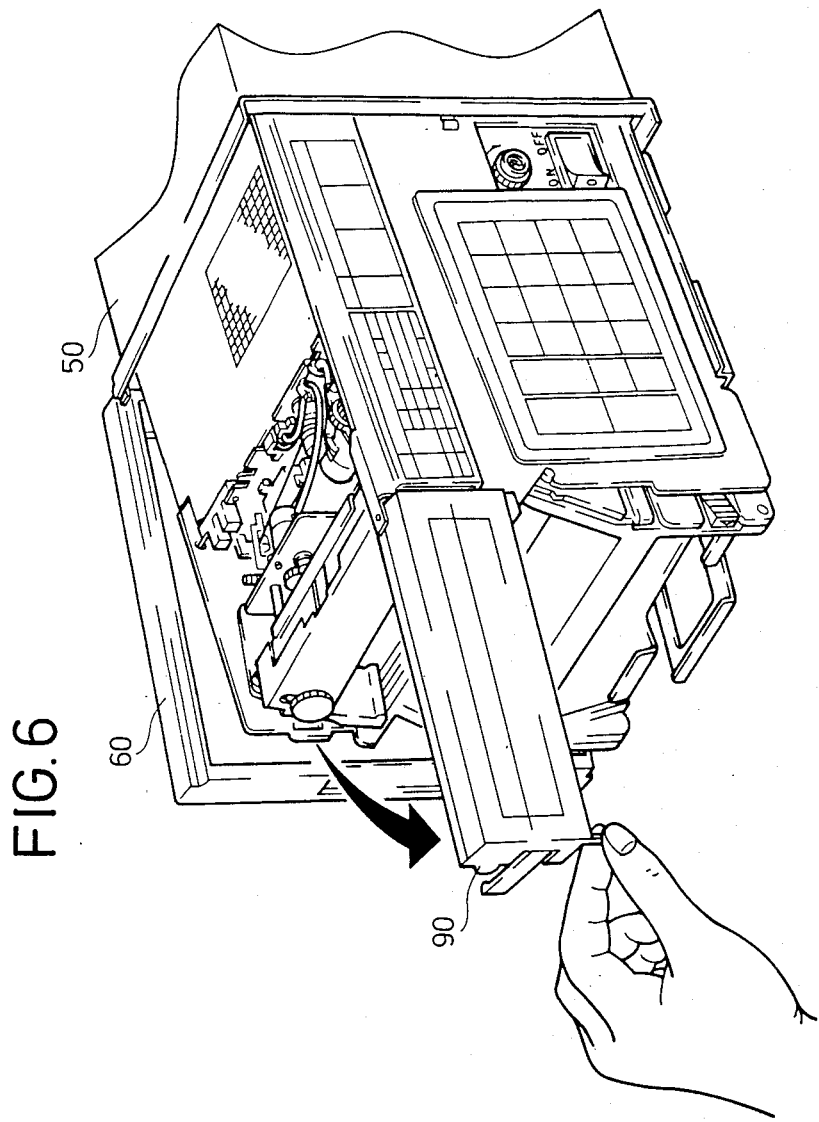
FIG. 6 is a perspective view depicting the rotating movement of a display unit of the embodiment of FIG. 3.

In FIG. 4, interior assembly 70 comprises a chart cassette 80 detachably attached to the lower front portion of assembly 70 (see FIG. 5). Cassette 80 houses recording sheet or chart 30. A display unit 90 is attached to the upper portion of assembly 70 in such a way that display unit 90 is rotatable in a direction opposite to the direction of rotation of door 60 (see FIG. 6). As shown in FIG. 3, display unit 90 has a digital display device 91 for digitally displaying measuring conditions and a bar graph display device 92 for displaying the magnitude of an analog signal in the form of a bar graph. Unit 90 further includes a display element 93 for displaying the recording conditions or alarm signals. An operating unit 100 is attached to one side of interior assembly 70 and is used for setting measurement conditions. When an operator is setting the measurement conditions, he rotates display unit 90 in such a manner that unit 90 is in coplanar relation to operating unit 100 (see FIG. 6) and sets the measuring conditions while concurrently observing the display device 91 of unit 90.

Figure 7:
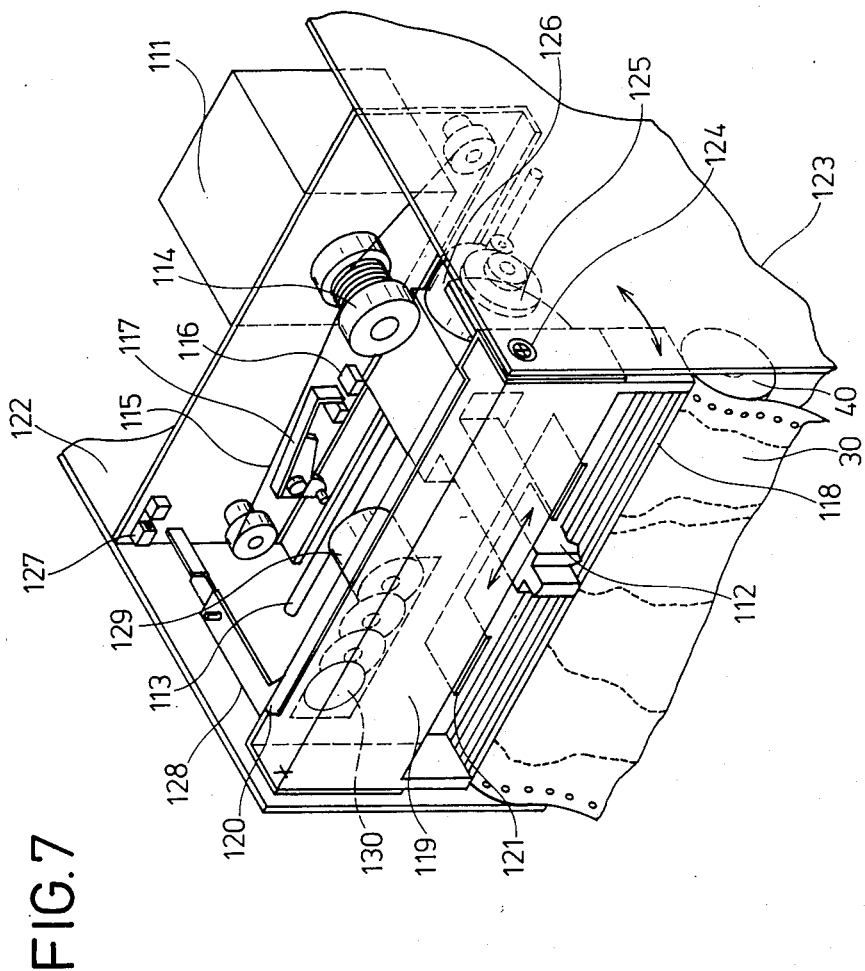
FIG. 7 is a broken away perspective view depicting major components of the interior assembly of FIG. 4.

Referring to FIG. 7, motor 111, such as a stepper motor, causes a carriage 112 to move along a guide rod 113. The rotation of motor 111 is transmitted through a pulley 114 and a string 115 to carriage 112. A lever 117 is rotatably mounted and driven by carriage 112 for intermittently interrupting a light beam emitted from a photosensor 116. A reference position of carriage 112 is detected by means of photosensor 116 and lever 117.

A multicolor inked ribbon 118, having a plurality of lengthwise extending different color strips or channels arranged in side by side relation, is housed in cassette 119, in such a way that ribbon 118 is moved in a predetermined direction in opposed relation to the effective recording width of recording sheet or chart 30. A cassette holder 120 detachably holds cassette 119 through a leaf spring 121 from the front portion of the main body of assembly 70. Cassette holder 120 is rotatably supported by a shaft or pin (for example, 124) at the upper front portion of the main body of assembly 70 between side walls 122 and 123, as depicted. A sector gear 125 is attached integrally with cassette holder 120 and is adapted to be reciprocally swung away by means of a shift motor 126. That is, holder 120 is caused to swing about the shafts or pins 124 in the direction of feed of sheet 30. A lever 128 is attached integrally with holder 120 and is adapted to intermittently interrupt light beams from photosensor 127. A rotating reference position of holder 120 is detected by photosensor 127 and lever 128.

A motor 129 feeds inked ribbon 118 through a gear train 130 in a predetermined direction.

Figure 8:
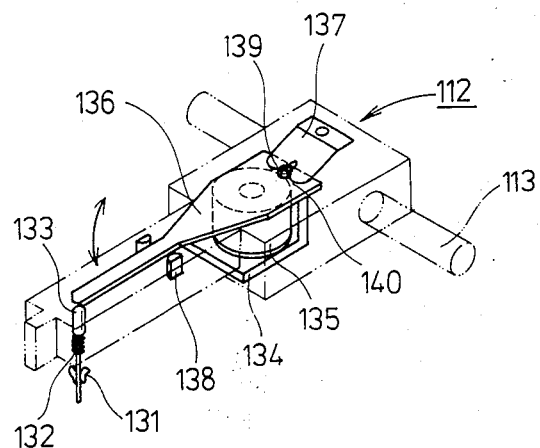
FIG. 8 is a perspective view depicting a carriage used in the embodiment of FIG. 3.

Referring now to FIG. 8, even though carriage 112 comprises a main body and a cover, it is shown to be of unitary construction, as indicated by the two dot chain lines. A bearing 131 is disposed adjacent to one end of the main body and a wire hammer is vertically movably inserted through a coiled spring 132 into bearing 131. A yoke 134 is disposed adjacent to the other end of the main body and a coil 135 and an armature 136 are disposed upon yoke 134, in the order named, thereby forming a magnetic circuit.

A leaf spring 137, adapted to be pressed against armature 136 is attached to the interior surface of the cover. The free end of leaf spring 137 is in opposed relation to the end face of yoke 134 through armature 136. Armature 136 is engaged with a guide 138, which acts to guide armature 136 in the vertical direction at the mid portion of the inner surface of the cover. One end of armature 136 is pressed against the end of wire hammer 133 and the other end thereof is pressed by leaf spring 137 so that armature 136 is in opposed relation to yoke 134 and coil 135.

A projection 139 is disposed at the inner surface of the cover adjacent to leaf spring 137 in such a way that projection 139 is extended beyond the free end of spring 137. A hole 140 is formed in armature 136 adjacent to the end of spring 137 for engagement with projection 139. The cover, with leaf spring 137 and armature 136 mounted thereon, is fitted over the main body. Thus, carriage 112 is formed as shown in FIG. 8. Depending on the energization or deenergization of coil 135, armature 136 is caused to rotate about a point of contact between yoke 134 and spring 137, so that wire hammer 133 is caused to be displaced substantially vertically.

The illustrative color dot recorder operates as follows. When a power source is turned ON, carriage 112 (see FIG. 7) is displaced to the 0% side (left) so that lever 117 is rotated and consequently a reference position signal, which causes a microcomputer (not shown) to interrupt its normal operation so as to obtain a reference position, is produced by photosensor 116. Then, carriage 112 is stopped at a reference position. When the color dot recorder is subjected to vibration, while carriage 112 is stopped at its reference position, carriage 112 is oscillated to the right and left so that lever 117 is also caused to vibrate. Thus, the reference position signal is intermittently derived from photosensor 116 in synchronism with the vibration. Such intermittent reference position signals are unwanted interrupt signals for the microcomputer and each time the microcomputer must invalidate such interrupt signal. It takes a considerably long period of time to invalidate such interrupt signal. Thus, the reference position signal is applied to the microcomputer through an AND gate which is adapted to selectively mask the reference position signal, in response to the mask signal derived from the microcomputer, so that the time required for invalidating the interrupt signal can be shortened.

Figure 9:
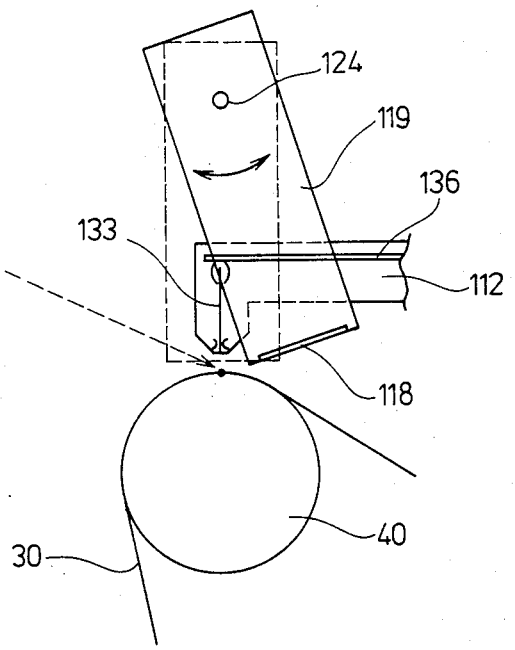
FIG. 9 is a view depicting the rotating movement of the ribbon cassette and carriage of FIG. 8.

As shown in FIGS. 9 and 7, cassette holder 120 rotates in the counter clockwise direction to the reference position, at which ribbon 118 is not in opposed relation to hammer 133, and lever 128 is rotated so that the reference position signal is derived from photosensor 127. Then, cassette holder 120 is stopped at the reference point. As a consequence, carriage 112 and ribbon 118 are reset.

Next, holder 120 is rotated through a predetermined angle by sector gear 125 and motor 126, in a clockwise direction from the reference position (as is the cassette 119), as shown in FIG. 9, so that the first color channel or strip of the inked ribbon 118 is brought into opposing relation to wire hammer 133.

After holding 120 (and cassette 119) has been rotated through a predetermined angle from the reference position, as described, carriage 112 is caused to move at a predetermined speed from reference position 0% toward a 100% position. When carriage 112 reaches a recording position in the first color strip or channel during the displacement of carriage 112, carriage 112 is stopped and coil 135 is selectively energized so that wire hammer 133 records a dot of that color. Thus, the magnitude of the measurement signal, as represented by the color of the first channel or strip, is recorded on the sheet or chart 30, as a dot of the color assigned to the first strip or channel. After the color dot has been recorded, carriage 112 is moved to and stopped at the 100% position.

When carriage 112 reaches the 100% position, holder 120 (and cassette 119) is rotated in the counterclockwise direction to the reference position shown in FIG. 9 so that holder 120 (and cassette 119) is stopped at the reference position in response to the reference position signal from photosensor 127. Consequently, ribbon 118 is moved away from the recording portion of sheet 30 so that the recorded results can be easily read out immediately after recording. After a predetermined time interval, holder 120 (and cassette 119) is rotated in the clockwise direction through a predetermined angle from the reference position by sector gear 125 and motor 126 so that the second color channel or strip of ribbon 118 is in opposed relation to hammer 133.

After cassette holder 120 (and cassette 119) has been rotated so that the second color channel of ribbon 118 is in opposed relation to hammer 133, carriage 112 is shifted at a predetermined speed from the 100% position toward the 0% position. When carriage 112 reaches a recording position in the second channel during the displacement, it is stopped and coil 135 is selectively energized so that hammer 133 records a colored dot. Thus, the magnitude of the measuring signal of the second channel is recorded on the sheet 30 as a dot of the color assigned to the second channel or strip. After the recording, carriage 112 is moved to and stopped at the 0% position while holder 120 (and cassette 119) is rotated in the counterclockwise direction to the reference position shown in FIG. 9 and is stopped.

The color dot recording operation described above is repeated as many times as desired up to the number of color strips or channels of the ribbon 118, so that the color dot recordings of a plurality of channels can be accomplished. If desired, various characters and symbols can be recorded in the form of colored dot matrix.

As stated, the detection of the angular reference position of cassette holder 120 may be carried out each time when the recording of each colored strip or channel is made. Alternatively, the detection may be carried out selectively after all colored strips or channels have been used to record the respective colors. Furthermore, in the case of the displacement of carriage 112, holder 112 may be held stationary at the reference point and may be displaced to a predetermined position only when a dot is recorded.

It should be noted that ribbon 118 is moved at a predetermined speed in a predetermined direction in synchronism with or independently of the shift of carriage 112.

The invention has many advantages. For example, carriage 112 has only one wire hammer 133. Thus, the number of components is substantially reduced in a color dot recorder, as compared to the conventional color dot recorders. As a result, advantageously, carriage 112 can be made compact in size and light in weight and can be fabricated at very low cost. Accordingly, the effective recording width of recording sheet 30 is relatively increased and the total width of the recorder is decreased, as compared with the prior art recorders. In addition, a relatively small motor is used to shift carriage 112 at high speed and power consumption is reduced substantially and heat dissipation is reduced. Also, degradation of recording quality, due to a blind section caused by insufficient rigidity of driving string and insufficient torque of the driving motor, is decreased to a minimum. Moreover, the replacement of the cassette 119 is effected at the front end of the color dot recorder so that replacement is made easy. Furthermore, since holder 120 is selectively rotated in the counterclockwise direction to the reference position shown in FIG. 9, ribbon 118 is moved away from the recording part of sheet 30 after recording, so that the recorded results can be readily read out immediately after recording.

The foregoing description is illustrative of the principles of the invention. Numerous modifications and extensions thereof would be apparent to the worker skilled in the art. All such modifications and extensions are to be considered to be within the scope and spirit of the invention.

What is claimed is:

1. A multiple color recording apparatus comprising
   a carriage comprising a single wire hammer for striking a dot and disposed to be movable in a direction of the width of a recording sheet;
   an inked ribbon cassette comprising an endless inked ribbon having a plurality of lengthwise extending different color strips and disposed so that said ribbon is moved in a predetermined direction in opposed relation with an effective recording width of said recording sheet, said cassette being detachably attached from a front portion of a main body of said apparatus;
   a driving mechanism, comprising a shaft disposed in such a position that said carriage is positioned between said shaft and said recording sheet, and adapted to selectively cause said cassette to rotate so that one of said plurality of strips of said ribbon corresponding to a plurality of analog signals is brought into opposed relation with said wire hammer to effect dot recording and then moved away from the recording sheet after recording so that the results recorded on said recording sheet is readily read through the front of said main body without the cassette interfering with the reading;
   an operating unit attached to one side of said main body in order to set measurement conditions; and
   a display unit comprising a digital display device for digitally displaying at least measurement conditions and rotatably attached to the front of said main body in such a way that said display unit will be flush with said operating unit.

2. The apparatus of claim 1, wherein said display unit comprises a bar graph display device disposed along the direction of movement of said carriage.

* * * * *